United States Patent

Mueller

[11] Patent Number: 6,112,146
[45] Date of Patent: Aug. 29, 2000

[54] METHOD AND DEVICE FOR DETERMINING A VARIABLE DESCRIBING THE SPEED OF A VEHICLE

[75] Inventor: Elmar Mueller, Markgroeningen, Germany

[73] Assignee: Robert Bosch GmbH, Stuttgart, Germany

[21] Appl. No.: 09/194,252

[22] PCT Filed: Feb. 12, 1998

[86] PCT No.: PCT/DE98/00390

§ 371 Date: Nov. 25, 1998

§ 102(e) Date: Nov. 25, 1998

[87] PCT Pub. No.: WO98/43858

PCT Pub. Date: Oct. 8, 1998

[30] Foreign Application Priority Data

Mar. 29, 1997 [DE] Germany .......................... 197 13 252

[51] Int. Cl.$^7$ ................................ G06F 7/00; G06F 17/00
[52] U.S. Cl. ................................ 701/71; 701/74; 701/75; 303/171; 303/173; 180/197
[58] Field of Search ..................... 701/71, 72, 73, 701/74, 75, 79, 93; 303/170, 171, 166, 173, 174, 189; 180/197

[56] References Cited

U.S. PATENT DOCUMENTS

| 5,272,634 | 12/1993 | Leibbrand et al. . |
| 5,364,174 | 11/1994 | Becker et al. . |
| 5,366,282 | 11/1994 | Schmitt et al. ........................ 303/141 |
| 5,419,624 | 5/1995 | Adler et al. ............................ 303/112 |
| 5,727,852 | 3/1998 | Pueschel et al. ....................... 701/75 |

FOREIGN PATENT DOCUMENTS 0 322 911  7/1989  European Pat. Off. .

Primary Examiner—William A. Cuchlinski, Jr.
Assistant Examiner—Gertrude Arthur
Attorney, Agent, or Firm—Kenyon & Kenyon

[57] ABSTRACT

A method and an apparatus for determining a variable describing the speed of a vehicle are provided. In this method, for at least two wheels, the speeds of those wheels are determined, and the variable describing the speed of the vehicle is determined at least as a function of the speed of a selected wheel. For this, an operating state of the vehicle is determined based on the speeds of at the least two wheels, the selected wheel being determined at least as a function of that operating state. In addition, plausibility queries for determining the selected wheel are performed for some of the determined operating states of the vehicle, as a function of the particular operating state of the vehicle that is determined.

12 Claims, 5 Drawing Sheets

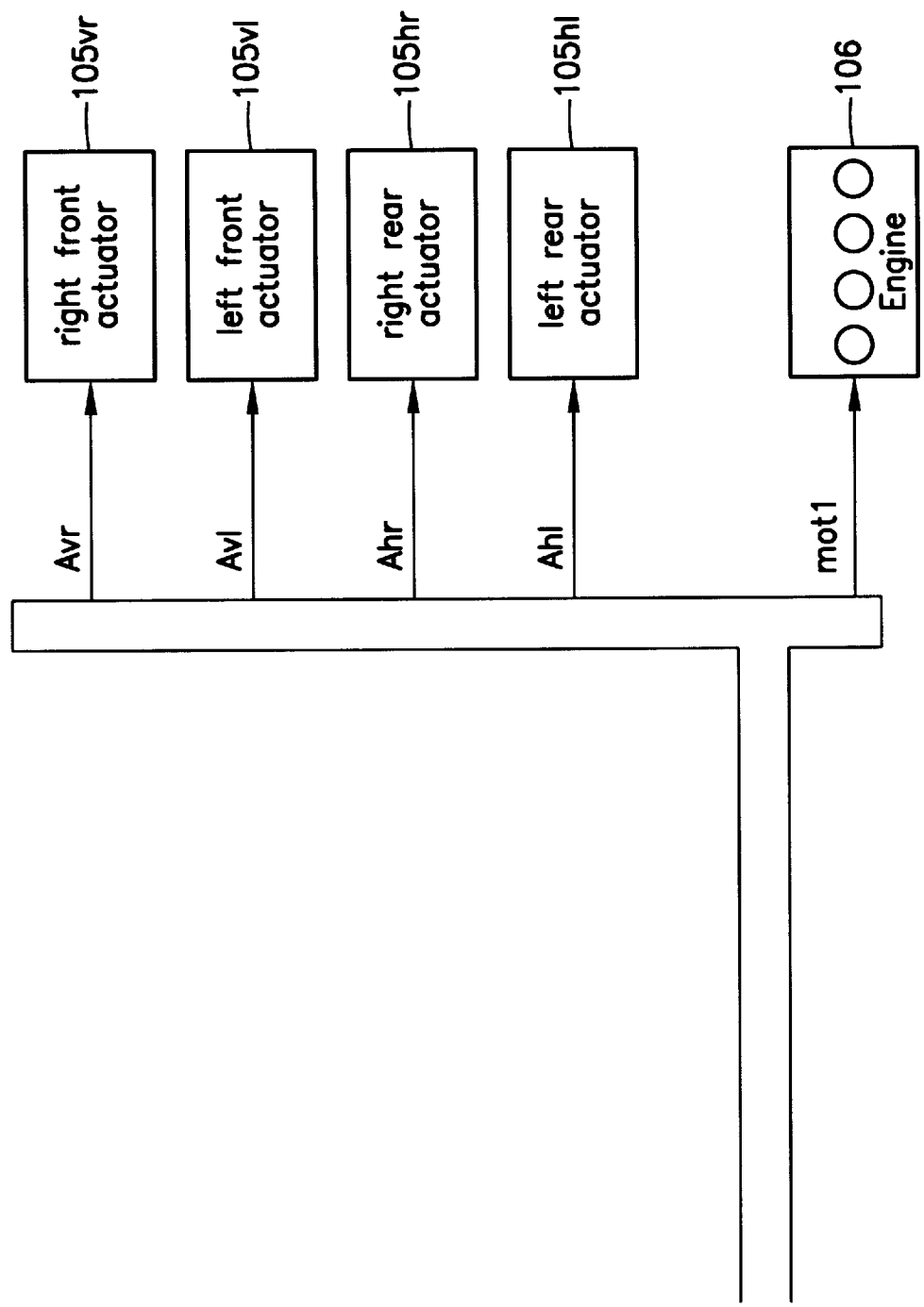

| Operating States | Speed Values |
|---|---|
| A1 | vs4, vs3, vs2, vs1, vref |
| A2 | vs4, vs3, vs2, vref, vs1 |
| A3 | vs4, vs3, vref, vs2, vs1 |
| A4 | vs4, vref, vs3, vs2, vs1 |
| A5 | vref, vs4, vs3, vs2, vs1 |

METHOD AND DEVICE FOR DETERMINING A VARIABLE DESCRIBING THE SPEED OF A VEHICLE

FIELD OF THE INVENTION

The present invention relates a method and an apparatus for determining a variable describing vehicle speed.

BACKGROUND INFORMATION

German Patent Aplication No. 38 33 212 (corresponding to U.S. Pat. No. 5,272,634) describes, for a vehicle driven at a single axle and equipped with an antilock braking control system, the creation of a reference variable for the vehicle speed outside the braking pressure control system. This is done essentially by determining an averaged wheel speed on the basis of the speeds of the two driven wheels. If the derivative over time of this averaged wheel speed is greater than zero, the reference variable is defined by the speed of the slower of the two driven wheels. If the derivative over time of this averaged wheel speed is less than zero, the reference variable is then defined by the speed of the faster of the two driven wheels. The slope of the reference variable for the vehicle speed is thus limited to a maximum value.

German Patent Application No. 40 09 195 (corresponding to U.S. Pat. No. 5,364,174) describes, for an antilock braking control system used in an all-wheel-drive vehicle, the creation of a reference speed required for traction control. In this context, the reference speed is essentially defined by the speed of the slowest wheel in the case of a speed increase, and by the speed of the third-fastest wheel in the case of a speed decrease. In the transition region between increase and decrease, the value attained by the slowest wheel speed is held constant. For the case where the speed of the third-fastest wheel deviates too greatly from an auxiliary reference speed, the reference speed is maintained concurrently with that auxiliary reference speed. The auxiliary reference speed is created by raising it by the speed of the third-fastest wheel, and decreasing it by the speed of the fastest wheel. It also is held constant in a transition region. If an instability exists due to incipient locking, the slope of the reference speed is defined by the slope of the auxiliary reference speed. If the wheels are slipping, the reference speed is held constant and the rise in the auxiliary reference speed is limited to a physically possible vehicle acceleration. If the rear wheels of the all-wheel-drive vehicle are decoupled from the drive system during braking, a slightly modified approach to creating the reference speed is used. Outside the control system, the reference speed is raised if the speeds of all the wheels are greater than it. If two or three wheels are faster than the reference speed, it is held constant. If none or only one of the wheels is faster than the reference speed, the reference speed is set downward.

Systems for controlling brake slip or traction are known in general form, for example from the book "Bremsanlagen für Kraftfahrzeuge" (Braking Systems for Motor Vehicles) published by Robert Bosch GmbH Stuttgart (VDI-Verlag, Düsseldorf, 1st edition 1994).

An object of the present invention is to improve the manner in which a variable describing the speed of a vehicle is determined.

SUMMARY OF THE INVENTION

An advantage of the method and the apparatus according to the present invention is that, the variable describing the speed of the vehicle can be determined for a vehicle driven in any fashion, i.e. for a vehicle with front-, all-, or rear-wheel drive, for any operating condition of the vehicle. The manner in which the variable describing vehicle speed is determined is independent of whether a control system implemented in the vehicle—such as a brake slip control system or a traction control system, or for example a control system at a higher level than the brake slip or traction control system—is active while it is being determined. One example of such a higher-level control system that may be mentioned here as an example is the vehicle dynamics control system as known, for example, from the publication "FDR—die Fahrdynamikregelung von Bosch", (FDR—Bosch Vehicle Dynamics Control System), which is published in Automobiltechnische Zeitschrift (ATZ) 96, 1994, Vol. 11, pp. 674–689.

Conventionally, a separate method and a separate apparatus for determining the variable describing the speed of the vehicle was needed for the various vehicle drive concepts and for each type of slip control system. With the method and the apparatus according to the present invention, a method and apparatus are now available which can be used for both brake slip and traction control systems.

The universal applicability of the method according to the present invention, and thus also of the apparatus according to the present invention, is based on the one hand on the fact that the variable describing the speed of the vehicle is created on the basis of an advantageously selected formula which takes into account a component describing the speed of the vehicle and a component describing the acceleration of the vehicle. On the other hand, it is based on the fact that the operating state of the vehicle at the time the variable describing the speed of the vehicle is created is determined; and that as a function of that operating state, that wheel of the vehicle which is best suited, at that time and with the vehicle in that operating state, for determining the variable describing the speed of the vehicle, is selected.

The operating state of the vehicle is advantageously determined at least as a function of the speeds determined for at least two wheels of the vehicle. In this context, the speeds of the at least two wheels are sorted by magnitude, and the variable describing the speed of the vehicle is compared to the sorted speeds. Proceeding from the operating states of the vehicle determined in this manner, a decision can be made regarding the wheel to be selected.

The speed of the wheel determined for the respective operating state of the vehicle is taken into account in creating the component describing the speed of the vehicle, and in creating the component describing the acceleration of the vehicle. It is advantageous in this context to weight the speed of the selected wheel in each case with a factor that was also determined at least as a function of the operating state of the vehicle. The factors define the degree to which the wheel selected for the respective operating state is involved in the creation of the variable describing the speed of the vehicle.

At least for some of the operating states of the vehicle, it is advantageous to refine the determination of the selected wheel, or the determination of the factors necessary for weighting of the speed of the selected wheel, using plausibility queries which are performed as a function of the respectively determined operating state, within the pertinent operating state.

The plausibility queries can, for example, be performed at least as a function of the speeds of the wheels or as a function of a variable describing the speed of the vehicle.

A further advantage of the method and the apparatus according to the present invention is that proceeding from known brake slip or traction control systems, essentially no additional sensor apparatus is required. The method and apparatus according to the present invention can thus, in order to sense the wheel rotation speeds of the individual wheels, utilize the sensors present in any case in slip or traction control systems.

BRIEF DESCRIPTION OF THE DRAWINGS

FIG. 4 shows a table providing various operating states of the vehicle for selecting a wheel of the vehicle required for determining the variable which describes the speed of the vehicle, and factors required for weighting of the speed of the selected wheel.

DETAILED DESCRIPTION

Figure 1:
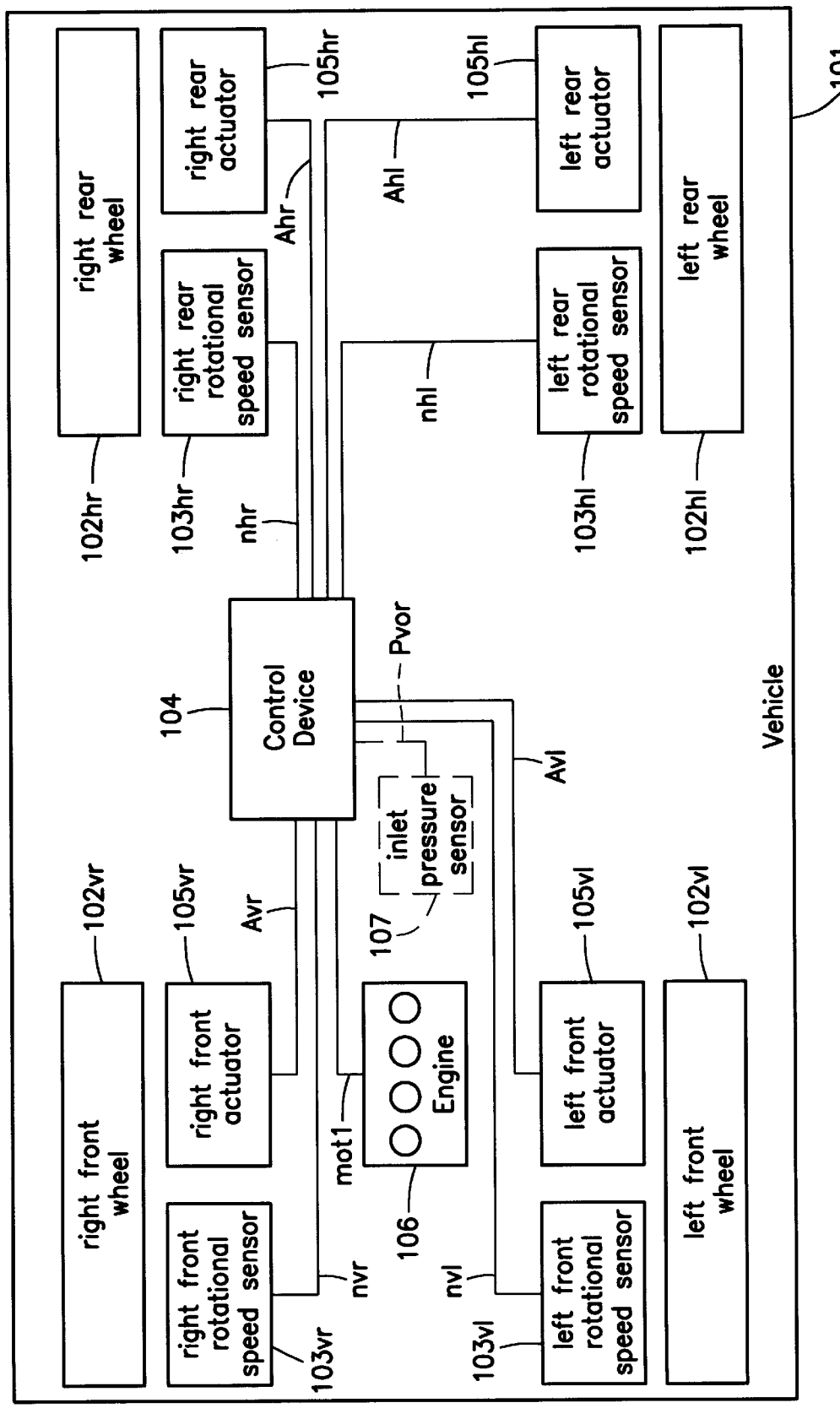
FIG. 1 shows a block diagram of a vehicle equipped with a traction control system in which an exemplary embodiment of a method and an apparatus according to the present invention are implemented.

The present invention is described with reference to from control systems known in the existing art with which, for example, the brake slip or traction of the wheels of a vehicle can be influenced. However, this is not intended to constitute any limitation on the idea according to the present invention. The method and the apparatus according to the present invention can also be used with reference to a control system that, for example, is of a higher order than a brake slip or traction control system. As shown in FIG. 1, additional sensors may be necessary for this purpose. In the case, for example, of a system for controlling the yaw rate of a vehicle, at least a steering angle sensor, a transverse acceleration sensor, and a yaw rate sensor may be required.

In systems for controlling brake slip, the braking torques acting on the wheels are usually varied in known fashion, by actuating the brakes, in order to control brake slip. In systems for controlling traction, in known fashion the traction of the wheels is usually set by generating a braking torque by actuating the wheel brakes or by influencing the drive torque delivered by the engine. For systems for controlling brake slip and/or traction, the same is true in terms of setting the corresponding slip values. In certain systems, the braking torques necessary to control the corresponding slip can be set individually for the corresponding wheels.

One of the objects of the present invention is to determine a variable describing the speed of a vehicle, which hereinafter will be referred to as the reference speed of the vehicle.

Conventionally a separate method or separate apparatus, for determining the reference speed of the vehicle was necessary for each type of slip or traction control system that was used in a vehicle. For example, the concept used in a brake slip controller was different from that in a traction controller.

Similarly, a different concept for determining the reference speed of the vehicle was previously necessary for each of the different vehicle drive concepts. For example, the concept for a vehicle driven at a single axle differs from that for an all-wheel-drive vehicle. In the case of a vehicle driven at a single axle, it is possible to resort to the non-driven wheels in determining the reference speed of the vehicle in a drive situation, since these wheels are free-running and thus normally do not slip. In an all-wheel drive vehicle, on the other hand, selection of the suitable wheel or wheels is more difficult, since normally all the wheels of an all-wheel-drive vehicle are subject to slip.

The method and the apparatus according to the present invention provides that the reference speed of the vehicle can be determined for any driven vehicle, and for any desired operating state of the vehicle. In this context, for example, in the operating state any desired control action of any desired slip controller can be performed.

FIG. 1 shows a vehicle 101 having wheels 102$vr$, 102$vl$, 102$hr$, and 102$hl$. Hereinafter the simplifying notation 102$ij$ will be introduced; in this the index i indicates whether the wheel is located on the rear axle (h) or front axle (v), and the index j indicates the allocation to the right (r) or left (l) side of the vehicle. This determination by way of the two indices i and j is analogous for all variables or components to which they are applied.

A wheel rotation speed sensor 103$ij$ is allocated to each wheel 102$ij$. The signal nij generated by the respective wheel rotation sensor 103$ij$ is conveyed to control device 104 for further processing. Additionally allocated to wheels 102$ij$ are actuators 105$ij$ with which the braking torques acting on the individual wheels can be set. Actuators 105$ij$ are, for example, valves for modulating the wheel brake cylinder pressure. The vehicle also has an engine 106.

Optionally, a sensor 107 can be provided with which the inlet pressure Pvor set by the driver in the braking circuit can be sensed. This pressure is conveyed to control unit 104 as signal Pvor.

In control unit 104, the signals conveyed to it are processed and analyzed. A variety of positioning signals can be output in accordance with the control system implemented in the control device. It is conceivable for control device 104 to generate positioning signals Aij with which actuators 105$ij$ associated with wheels 102$ij$ are activated to set braking torques. Also conceivable is output of a positioning signal mot1 with which the drive torque delivered by engine 106 can be influenced.

The sensor apparatus described in conjunction with FIG. 1 represents the sensor apparatus that may be necessary in terms of the method and the apparatus according to the present invention. If the vehicle is equipped with a system for controlling brake slip or a system for controlling traction, wheel rotation sensors 103$ij$ are already present because of these systems.

Figure 2A:
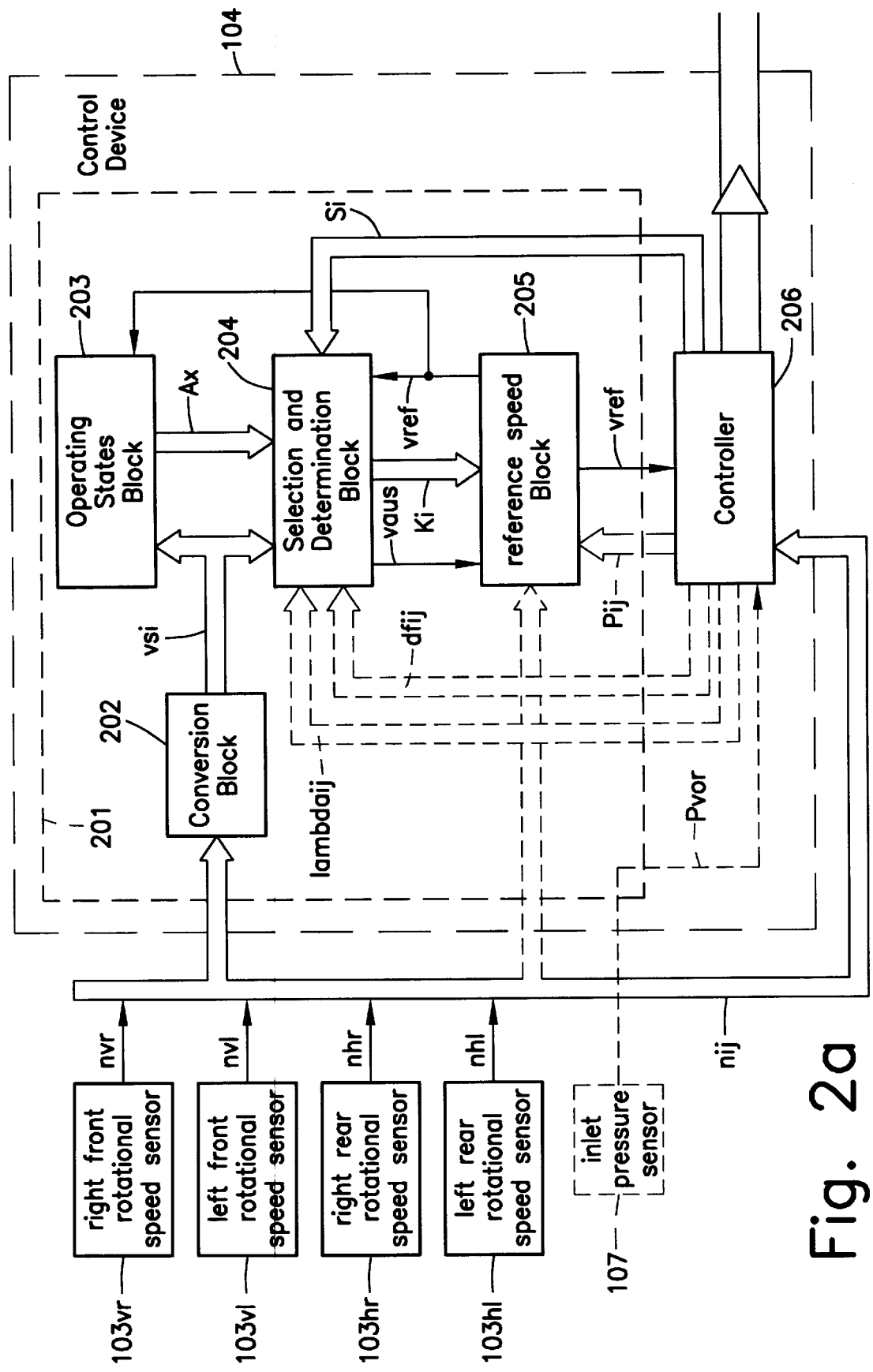
FIG. 2 shows a block diagram of a sensor and actuator apparatus utilized by the apparatus according to the present invention and used for performing the method according to the present invention, and a structure of a control device used for the sensor and actuator apparatus.

Before discussing the apparatus shown in FIG. 2, the formula underlying the method according to the present invention for determining the reference speed of the vehicle will be presented.

Determination of the reference speed of the vehicle includes two formulas. First, the reference speed of the vehicle is determined based on an extrapolation formula defined by the equation $$vref(n) = vref(n-1) + ax(n) \qquad (1).$$

In equation (1), the expression vref(n) represents the value of the reference speed vref for the current time step n, and the expression vref(n−1) represents its value for the previous time step n−1. The expression ax(n) represents the value of a variable ax (described below) for the current time step n.

In addition to the aforementioned first formula, a second formula is used to select one of the vehicle's wheels which is used for support or for determination of the reference speed of the vehicle.

Selection of a wheel of the vehicle using the second formula is described in detail below with reference to FIG. 4. The operating state of the vehicle is determined as a function of the speeds vij of the wheels, which are created on the basis of signals nij, and the reference speed vref of the vehicle. For at least some of the operating states thus determined, plausibility queries are performed as a function of the respective operating state that is determined. As a function of these operating states and (if performed) the plausibility queries, that wheel of the vehicle which is most suitable for that purpose, at the time of determining the reference speed of the vehicle, is determined.

Based on the speed vaus of the selected wheel, the variable ax is created for the time step n, for example using the equation $$ax(n)=ax(n-1)+koax*(vaus(n)-vref(n-1)) \qquad (2)$$

The variable ax represents a variable describing the acceleration of the vehicle. The functions of the variable ax in the determination of the reference speed of the vehicle is described in detail below. All that will be mentioned in this connection is that the variable ax can assume, with respect to the reference speed of the vehicle, the function of an adaptive slope or the function of a correction term.

As equation (2) shows, the value ax(n) of the variable ax for the current time step n depends on the value of the expression ax(n-1) and on a speed difference weighted with a first factor koax. This speed difference is created as a function of the expression vaus(n), which describes the speed vaus of the selected wheel at the current time step n, and of the expression vref(n-1), i.e. the value of the reference speed vref for the time step n-1.

The determination of the variable ax indicated by way of equation (2) is also referred to as "supporting" the variable ax using the speed vaus of the selected wheel. A corresponding support takes place for the reference speed of the vehicle based on the value vref(n) determined using equation (1). This is described, for example, by the equation $$vref(n+1)=vref(n)+kovx*(vaus(n)-vref(n-1)) \qquad (3).$$

The value of the expression vref(n+1), which represents the value of the reference speed vref of the vehicle for the subsequent time step n+1, depends on the value of the expression vref(n) and on a speed difference weighted with a second factor kovx. This speed difference corresponds to the one in equation (2).

Both the value of the first factor koax and that of the second factor kovx are determined, like the selected wheel, using the second formula. If it is found, based on the plausibility queries, that the speed profile of the selected wheel is particularly plausible for supporting the reference speed of the vehicle, then large values are allocated to both factors. If the speed profile of the selected wheel is less plausible, smaller values are accordingly allocated to the two factors. If no wheel at all is suitable for support, a value of zero is allocated to the two factors. The two factors thus define the extent to which the selected wheel is involved in the determination of the reference speed of the vehicle.

Inserting equations (1) and (2) into equation (3) yields the following expression for the value of the reference speed vref of the vehicle for the time step n+1:

$$vref(n+1)=[vref(n-1)+kovx*(vaus(n)-vref(n-1))]+[ax(n-1)+ \\ koax*(vaus(n)-vref(n-1))]=vvant(n+1)+vaant(n+1) \qquad (4)$$

Equation (4) can be used to represent the determination of the reference speed of the vehicle as follows: The value vref(n+1) for the reference speed of the vehicle for the time step n+1 can be determined as a function of a component vvant(n+1) describing the speed of the vehicle (the first expression in square brackets) and as a function of a component vaant(n+1) describing the acceleration of the vehicle (the second expression in square brackets). The first component, which describes the speed of the vehicle, is composed, with reference to the time step n+1, of a previous value for the reference speed of the vehicle and of the difference, already described above, weighted with the first factor kovx. The second component, which describes the acceleration of the vehicle, is composed of a value of the variable ax for a previous time step and of the difference, already described above, weighted with a second factor koax.

If the control system implemented in the vehicle is a system for controlling brake slip, or if a higher-level control system is performing a brake slip control action by way of a lower-level brake slip controller, a further mechanism can advantageously be added in such cases to the two formulas described above. With this further mechanism, an additional support of the reference speed of the vehicle is performed as a function of the speed of one wheel. This wheel is determined in known fashion, in so-called adaptation phases, by controlled underbraking of individual wheels, i.e. by controlled pressure reduction in the wheel brake cylinders of those wheels. In this context, the wheel determined in this fashion can be different from the one determined using the second mechanism.

The reference speed of the vehicle determined using the method and the apparatus according to the present invention is used in the control systems already mentioned in order, for example, to create the slip values of the wheels.

FIG. 2 shows a structure of control device 104 which may be necessary for the apparatus according to the present invention and for performing the method according to the present invention. The control device is subdivided essentially into two regions. One region 201 comprises the blocks which may be necessary for the present invention. These are blocks 202, 203, 204, and 205. The other region is constituted by a block 206 which essentially represents the controller of the control system that is implemented. FIG. 2 also shows the sensor apparatus which may be necessary for the method and the apparatus according to the present invention. This can, as already mentioned above, be expanded to include further sensors in addition to the sensor apparatus of the slip or traction control system that is implemented.

The variables entered in FIG. 2 are not depicted in time-discrete fashion. The time-discrete values for various variables required in accordance with equations (1) through (3) are determined in the corresponding blocks.

The signals nij generated by wheel rotation speed sensors 103ij, which represent the wheel rotation speeds of the respective wheels 102ij, are conveyed to blocks 202 and 206 (described below). The signals can optionally also be conveyed to a block 205. For the case in which a sensor 107 is present with which the inlet pressure Pvor set by the driver in the braking circuit can be sensed, the signal Pvor generated with this sensor 107 is conveyed to block 206.

In block 202, the wheel rotation speeds nij are converted into variables vij representing the speeds of the wheels, and sorted by magnitude. Since the variables vij are internal variables of block 202, they are not shown in FIG. 2. Wheel speeds vij, sorted by magnitude, are conveyed as variables vsi from block 202 to blocks 203 and 204. For variables vsi sorted by magnitude, let the following allocation, for example, apply: Let the speed of the slowest wheel, i.e. the smallest wheel speed vij, be allocated to the variable vs1. Let the speed of the second-slowest wheel be allocated to the variable vs2, the speed of the second-fastest to the variable vs3, and the speed of the fastest wheel, i.e. the greatest wheel speed vij, to the variable vs4. This allocation may be expressed by the relationship vs1<vs2<vs3<vs4.

Based on the wheel speeds vs1 sorted by magnitude, operating states Ax of the vehicle are determined in block 203 and conveyed to block 204. The determination of operating states Ax involves not only the variables vs1 but also the reference speed vref of the vehicle determined in block 205. The determination of operating states Ax proceeding in block 203 will be discussed in more detail in the context of the description of FIG. 4.

In block 204, the following determinations occur, based at least on the operating states Ax of the vehicle: On the one hand, that wheel of the vehicle which is being used to determine or support the reference speed of the vehicle is selected. On the other hand, the factors kovx and koax (already mentioned) are determined. Both the speed vaus of the selected wheel and the two factors kovx and koax (the two factors are combined in FIG. 2 into the variable Ki) are conveyed to block 205.

For selection of the wheel used for support or for determination of the reference speed of the vehicle, and for determination of the factors kovx and koax, plausibility queries are performed in block 204 for at least some of the operating states Ax, as a function of the respective operating state that is determined. For some operating states Ax, however, such plausibility queries are not necessary, since for these operating states, for example, either the selected wheel has already been identified a priori based on the operating state, or on the basis of the operating state no support of the reference speed by a wheel of the vehicle appears advisable.

In addition to the wheel speeds vs1 sorted by magnitude, additional variables are involved in the plausibility queries. For example, for this purpose the reference speed vref of the vehicle is conveyed from block 204 to block 205. In addition, the variables lambdaij describing the slip values of the individual wheels, or signals dfij which indicate the failure of individual wheel rotation speed sensors, can optionally be conveyed for this purpose from block 206 to block 204. Block 204 moreover receives signals Si from block 206 in order to perform the plausibility queries. It is important in this context to note that signals Si are a combination of various signals.

The signals or variables combined under the designation Si can, for example, contain signals which deliver information as to whether an action by the slip or traction system that is implemented is present for the time step in question. They can also contain information regarding the number of wheels being controlled in the time step in question. They can moreover contain, in the form of a variable describing the acceleration of the vehicle, information regarding the acceleration behavior of the vehicle, in particular as to whether the vehicle is in a transition from deceleration to acceleration, i.e. in a corresponding load alteration, in the time step in question.

The following queries are used, for example, as plausibility queries: Using comparisons of the sorted wheel speeds vs1 with one another or with the reference speed vref, it is possible to check whether the wheel speeds are behaving plausibly with respect to one another or to the reference speed, i.e. whether they are synchronous with respect to one another and are each stable. One possibility, for example, is to determine the spacing of the individual wheel speeds from one another or the spacing between individual wheel speeds and the reference speed. For example, a smaller spacing between one wheel speed and the reference speed is an indication that this speed might be suitable for supporting the reference speed.

Another possibility with regard to the plausibility queries is to consider the load alteration described above. If it is found, at the point in time being instantaneously considered, that a load alteration of this kind is present, it can be predictively reacted to in the determination of the reference speed, by selecting in this situation, when determining the reference speed, one of the wheels whose speed at the time of the load alteration is greater than the instantaneously applicable reference speeds. Such a wheel is selected, for example, because as a result of the load alteration the vehicle speed will probably rise, and a reference speed which is also rising is necessary to describe it. Further plausibility queries can be implemented, for example, by querying the number of wheels being controlled.

In addition, various plausibility queries can be implemented on the basis of the slip values lambdaij, if present. For example, based on the individual slip values lambdaij it is possible to ascertain which wheels are behaving in unstable fashion, and are thus less suitable for supporting the reference speed. It is moreover possible, by comparing the sum of the individual slip values lambdaij to the sum of the absolute values of the individual slip values, to ascertain whether or not the wheels of the vehicle are in a stable state.

Plausibility queries based on the signals dfij, if present, are also conceivable. The signals dfij indicate whether the wheel rotation speed sensors 103$ij$ are defective, and if so which of them. With this information, it is possible via queries to determine the wheels whose speeds are not suitable for supporting the reference speed.

The listing of the above plausibility queries does not constitute a comprehensive listing, and is not intended to be limiting. It is entirely conceivable to use further plausibility queries. It is also conceivable to use different plausibility queries in each case for the determination of the selected wheel and for the determination of the two factors. Depending on the operating state Ax, it may then consequently happen that the same or different plausibility queries are used for the determination of the selected wheel and for the determination of the two factors.

In block 205, the variable describing the speed of the vehicle (the reference speed vref) is determined. For this purpose, the speed vaus of the selected wheel, as well as the first factor koax and the second factor kovx (via the variable Ki), are conveyed to block 205 from block 204. Based on these variables, the reference speed vref of the vehicle is determined in block 205, for example in accordance with equations (1) through (3), and is output both to blocks 203, 204 and to block 206.

Optionally, the signals nij generated by wheel rotation speed sensors 103$ij$, which are converted internally into the variables vij describing the speeds of the wheels, can on the one hand be conveyed to block 205. On the other hand, the variables Pij describing the wheel brake cylinder pressures can optionally be conveyed to block 205 from block 206. Based on the variables Pij and vij, a correction (yet to be described) of the variable vref can be performed in block 205.

Block 206 represents the controller used for the control system implemented in the vehicle. The input variables conveyed to block 206 are the signals nij generated by wheel rotation speed sensors 103$ij$, and the reference speed vref determined in block 206.

Optionally, the variable Pvor determined by way of a sensor 107 can be conveyed to block 206. If this variable is available in block 206, the wheel brake cylinder pressure Pij can be determined on the basis of this variable and in consideration of the activation signals Aij for actuators 105*ij* (which, for example, describe the actuation times of these actuators) determined in block 206, for example using a hydraulic model known from the aforementioned article published in Automobiltechnische Zeitschrift. An alternative possibility, if the wheel brake cylinder pressures are to be taken into account in block 205, is also to sense the wheel brake cylinder pressures using suitable sensors.

The aforementioned signals Si are also determined in block 206. The determination of the signals Si involves at least the variables nij. Also taken into account are controller-internal variables which, for example, contain information concerning the controller actions performed by the control system.

In the event the variables lambdaij describing the slip of the wheels, or the signals dfij which indicate a fault in the corresponding wheel rotation speed sensor 103*ij*, are needed in block 204, these are generated in block 206. The variables nij are involved in the determination of the variables lambdaij and in the determination of the signals dfij.

In addition, in accordance with the control system that is implemented, block 206 generates, for example at least on the basis of the signals nij and the reference speed vref of the vehicle, activation signals Aij for actuators 105*ij* or a signal mot1 for influencing the drive torque generated by engine 106. The braking force acting on the corresponding wheel can be set by way of actuators 105*ij*. The slip values of the individual wheels can be controlled by influencing the wheel forces, and the total slip of the wheels can be controlled by influencing the drive torque generated by the engine. Depending on which type of control system is involved, additional variables necessary for control can be conveyed to block 206, or block 206 can generate further variables necessary for control.

The utilization indicated in the exemplary embodiment of the method and apparatus according to the present invention is not intended to constitute any limitation. It is conceivable also to use the method and apparatus according to the present invention in other systems in which a variable describing the speed of the vehicle is also necessary.

Figure 3:
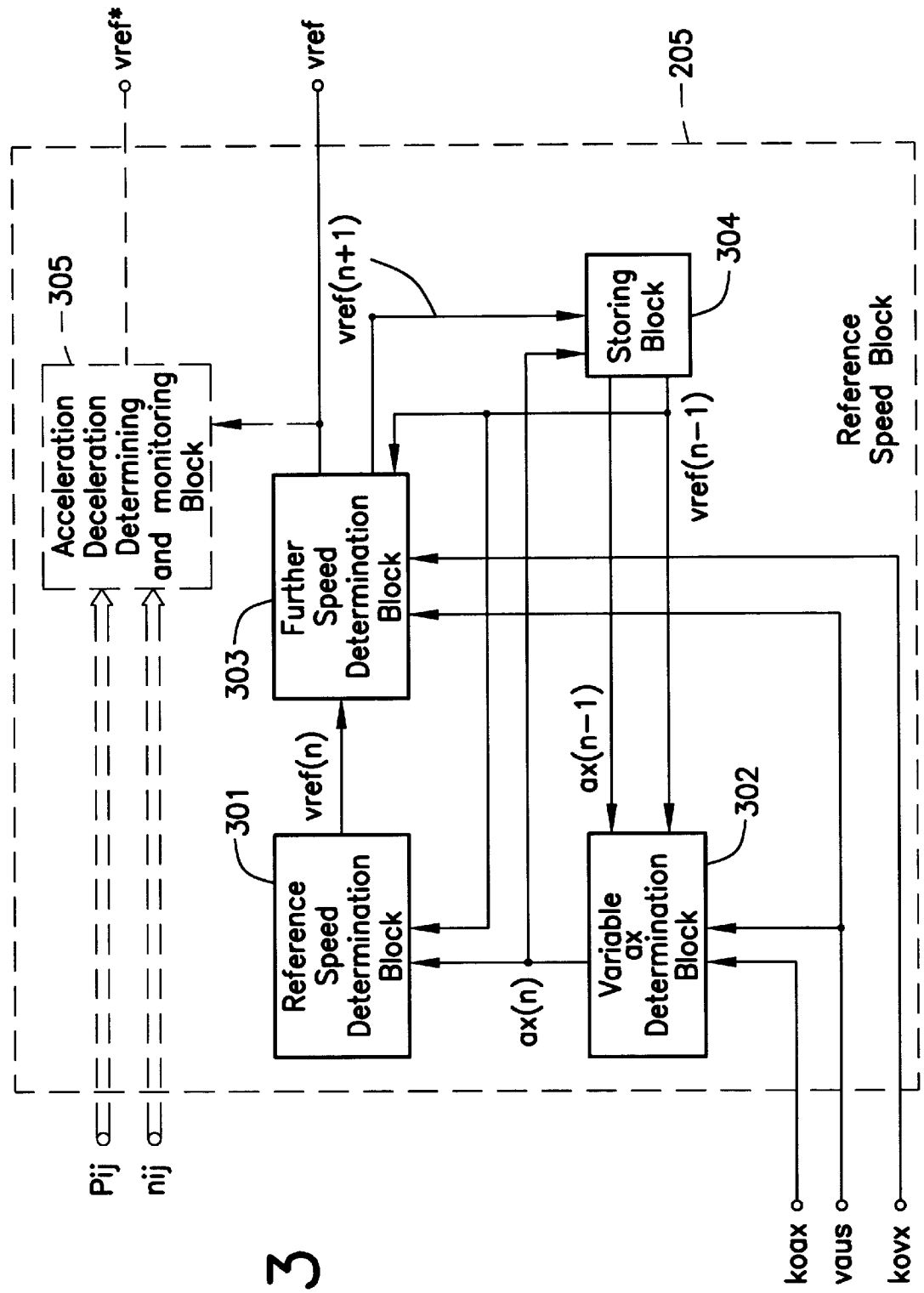
FIG. 3 shows a block diagram of the method and apparatus according to the present invention which uses variables for determining a variable describing (indicative of) a speed of a vehicle.

FIG. 3 shows in detail the determination of the reference speed vref of the vehicle taking place in block 205, in which equations (1) through (3) are essentially to be considered.

In a block 301, the value vref(n) of the reference speed for the time step n is determined, for example in accordance with equation (1), on the basis of a value ax(n) of the variable ax at the time step n and a value vref(n−1) of the reference speed at the time step n−1. This value vref(n) is conveyed to a block 303.

In a block 302, the previously mentioned value ax(n) of the variable ax for the time step n is determined. For this, the factor koax, the speed vaus of the selected wheel, the value ax(n−1) of the variable ax, and the value vref(n−1) of the reference speed for the time step n−1 are conveyed to block 302. On the basis of the value vaus, firstly the value vaus(n) for the time step n is determined in block 302. As a function of the variables present in block 302, the value ax(n) of the variable ax for the time step n is determined, for example in accordance with equation (2). The value ax(n) is conveyed both to block 301 and to a block 304.

Also conveyed to block 303, in addition to the value vref(n) of the reference speed for the time speed n, are the speed vaus of the selected wheel, the factor kovx, and the value vref(n−1) of the reference speed for the time step n−1. In block 303, based on the speed vaus, the value vaus(n) of that variable for the time step n is first determined. As a function of the variables present in block 303, the value vref(n+1) of the reference speed for the time step n+1 is determined, for example in accordance with equation (3). This value vref(n+1) is conveyed to block 304. In addition, a temporally continuous signal vref for the reference speed is output from block 303. This signal can be generated from the temporally discrete values vref(n+1), for example using a hold element. The signal or variable vref is made available for further blocks outside block 205.

The values ax(n) and vref(n+1) are stored in block 304. The value ax(n) is thus available to block 302 for a subsequent time step. The value vref(n+1) is also available to blocks 301, 302, and 303 for a subsequent time step.

Optionally, a block 305 can be provided in block 205, for the case in which the wheel brake cylinder pressures Pij are available in block 205. Based on the wheel rotation speeds nij which are converted in block 305 into the variables vij representing the speeds of the wheels, and on the wheel brake cylinder pressures Pij, the accelerations and decelerations of the individual wheels 102*ij* can be determined and monitored in block 305. On the basis of these accelerations and decelerations of the individual wheels, in block 305 the variable vref conveyed to it can be corrected to a variable vref* which can then be output for other blocks located outside block 205.

In the case of initialization of the entire control system, such as occurs, for example, at the beginning of vehicle operation after turning the ignition key, suitable starting values can be allocated to the corresponding variables required for recursive creation of the variables ax and vref.

FIG. 4 shows, in a form of a table, the determination of the operating states Ax of the vehicle which occurs in block 203.

The operating states Ax are determined as a function of the speeds of the wheels and the reference speed. For this purpose, the reference speed vref is compared to the speeds vs1 sorted by magnitude, and correspondingly sorted in. This comparison results, in the present exemplary embodiment, in five different operating states. In the tabular depiction selected, these are the operating states A1, A2, A3, A4, and A5.

Referring to FIG. 4, it should be noted with regard to block 204 that in the operating states Ax, the plausibility queries for determination of a selected wheel for determination of the reference speed, and the plausibility queries for determination of the two factors necessary for weighting of the speed of the selected wheel, are determined as a function of the particular operating state that is determined. In this context, the two factors are determined in such a way that the greater the suitability of the selected wheel for a support, the higher their values.

In the case of operating states for which, based on the plausibility queries, it is ascertained that one wheel is suitable for the determination of the reference speed (values other than zero being allocated in such cases to the two factors koax and kovx), the reference speed vref is determined in accordance with equation (4). In this case the variable ax constitutes an adaptive slope for the reference speed vref, which in accordance with equation (2) is based on the difference created as a function of the speed vaus of the selected wheel and the reference speed vref. The result is that, as a consequence of the variable ax acting as a kind of error correction term, the reference speed vref is adjusted to the vehicle speed that actually exists.

In the case of operating states for which it is ascertained, based on the plausibility queries, that none of the wheels is suitable for the determination of the reference speed (these operating states being referred to as unstable operating states), the two factors are set to zero. From equations (2) and (3) it is apparent that in this case no further support takes place either for variable ax or for variable vref; and for both variables, the value for the next time step is evident from the value of the previous time step. The result, according to equation (4), is that the value vref(n+1) of the reference speed is influenced exclusively via a constant component ax(n−1), and is thus extrapolated. In this case the variable ax constitutes a fixed value based on the extrapolation value ax(n−1) adapted up to that point. The result of this is that in an unstable operating state of this kind, the slope of the reference speed of the vehicle is always obtained as a function of the value ax(n−1) of the last stable operating state. Different slopes consequently result for the reference speed vref of the vehicle as a function of the last stable operating state.

In this connection, be it noted that the term "slope" is not to be understood in the strictly mathematical sense with respect to the variable ax. In other words, the variable ax does not constitute the derivative over time of the reference speed. Instead, the use of the term "slope" in connection with the variable ax is intended to express the fact that the time profile of the reference speed is influenced by the additive consideration of the variable ax. The greater the value of the variable ax, the more sharply the reference speed vref increases.

What is claimed is:

1. A method for determining a speed variable which is indicative of a speed of a vehicle, comprising the steps of:
   determining wheel speeds of at least two wheels of the vehicle;
   determining an operating state of the vehicle as a function of the wheel speeds;
   performing plausibility queries for at least some operating states of the vehicle to select a particular wheel of the at least two wheels, the plausibility queries being performed as a function of the determined operating state; and
   determining the speed variable as a function of a respective wheel speed of the selected particular wheel.

2. The method according to claim 1, wherein the determined operating state is determined as a further function of the speed variable.

3. The method according to claim 2, wherein the step of determining the operating state includes the steps of:
   sorting the wheel speeds by magnitude; and
   comparing the speed variable to the sorted wheel speeds.

4. The method according to claim 1, wherein the speed variable is determined as a function of a first component indicative of the speed of the vehicle and a second component indicative of an acceleration of the vehicle.

5. The method according to claim 4, wherein the first component is determined as a function of one of:
   a previous value of the speed variable, and
   the respective wheel speed of the selected particular wheel weighted with a predetermined factor.

6. The method according to claim 5, wherein the plausibility queries for the at least some of the operating states of the vehicle are performed to determine the predetermined factor.

7. The method according to claim 4, wherein the second component is determined as a function of one of:
   a variable indicative of the acceleration of the vehicle, and
   the respective wheel speed of the selected particular wheel weighted with a predetermined factor.

8. The method according to claim 7, wherein the plausibility queries for the at least some of the operating states of the vehicle are performed to determine the predetermined factor.

9. The method according to claim 1, wherein the plausibility queries are performed as a function of at least one of i) the wheel speeds, and ii) a variable indicative of an acceleration of the vehicle.

10. The method according to claim 1, wherein the method is utilized in a slip control system.

11. The method according to claim 10, wherein the slip control system is one of a brake slip control system and a traction control system.

12. An apparatus for determining a speed variable indicative of a speed of a vehicle, comprising:
    a first arrangement determining wheel speeds of at least two wheels of the vehicle;
    a second arrangement determining an operating state of the vehicle as a function of the wheel speeds;
    a third arrangement performing plausibility queries for at least some operating states of the vehicle to select a particular wheel of the at least two wheels, the plausibility queries being performed as a function of the determined operating state; and
    a fourth arrangement determining the speed variable at least as a function of a respective wheel speed of the selected particular wheel.

* * * * *